April 8, 1924.

G. R. PARANTEAU

FRUIT PITTING MACHINE

Filed Dec. 9, 1922

INVENTOR,
George R. Paranteau
BY
ATTORNEYS.

April 8, 1924.

G. R. PARANTEAU

1,489,455

FRUIT PITTING MACHINE

Filed Dec. 9, 1922   6 Sheets-Sheet 3

INVENTOR,
George R. Paranteau,
BY
ATTORNEYS.

Patented Apr. 8, 1924.

1,489,455

UNITED STATES PATENT OFFICE.

GEORGE R. PARANTEAU, OF OXNARD, CALIFORNIA.

FRUIT-PITTING MACHINE.

Application filed December 9, 1922. Serial No. 605,795.

*To all whom it may concern:*

Be it known that I, GEORGE R. PARANTEAU, a citizen of the United States, residing at Oxnard, in the county of Ventura and State of California, have invented new and useful Improvements in Fruit-Pitting Machines, of which the following is a specification.

This invention relates to fruit pitting machines and has for its object to provide improvements therein which will be superior with respect to relative simplicity and inexpensiveness of construction, taken conjointly with positiveness and effectiveness in operation, reliablity in action, facility in control and durability, and which will be generally superior in serviceability.

With the above and other objects in view, the invention consists in the novel and useful provision, formation, construction, combination, association and inter-relation of parts, members and features, all as hereinafter described, shown in the drawing, and finally pointed out in claims.

In the drawings.

Corresponding parts in all the figures are designated by the same reference characters.

Referring with particularity to the drawings, the fruit pitting machine is designated in its entirety and in one embodiment by A, and of which $a$ is a suitable frame or standard for supporting elements to be hereinafter described in detail. The frame $a$ may be conventional in form, that shown in the drawings including the usual legs 1 which are in spaced relation and support a suitable bed 2. Mounted upon the bed 2 are fruit advancing means B, fruit severing and pitting or pit-discharging means C, fruit grasping means D, means E for releasing fruit from the fruit grasping means D, and means F for centering each piece or specimen of fruit with respect to the means C. Means G are also provided for imparting axial movement to the fruit grasping means D, whereby the fruit is rotated or turned during the severing and pit-discharging actions. A suitable conveyer H is provided for delivering fruit to the means D. There are likewise included two hoppers J and K. In the embodiment shown it is intended that fruit received in the hopper J should be placed either manually or automatically upon the means H and the means H in turn automatically delivers the fruit in proper step and sequence to the fruit grasping means D to perform the severing and pitting operations, whereupon the severed fruit minus the pit is received within the hopper K. The hopper K in particular is provided with conveying means which will deliver the severed fruit to a determined point. Operating means L are provided for the advancing means B, and a main drive M is provided for such operating means L, and also for the conveyer H and for the belt in the hopper K. The conveyer H is driven from the operating means L.

Figure 8:
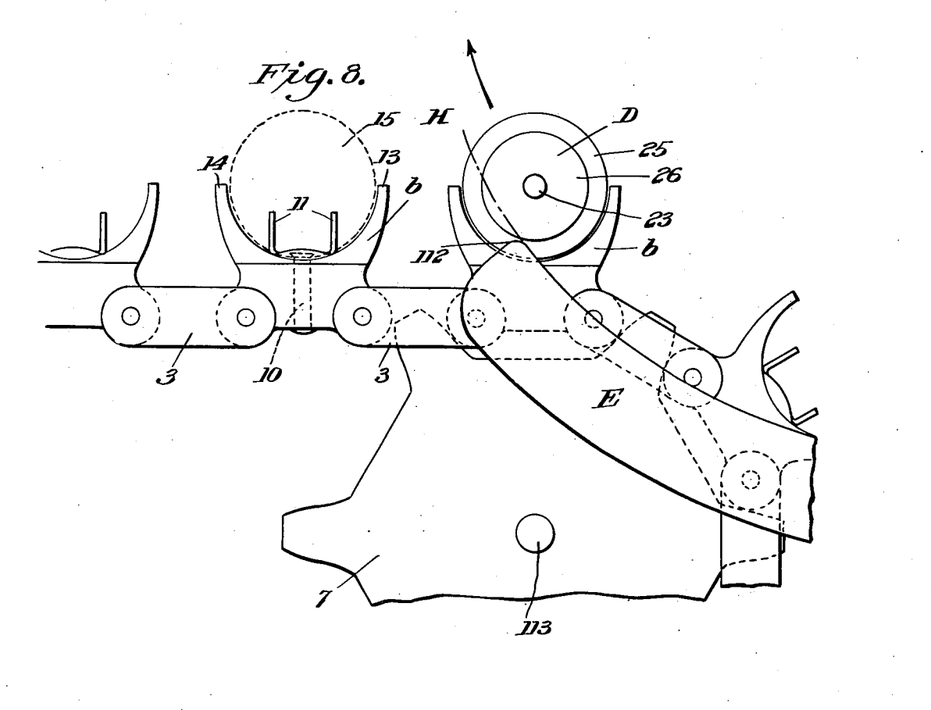
Figure 8 is an enlarged fragmentary side elevation of part of the disclosure of Figure 1, in detached position, and particularly illustrating the operation of the machine at the moment when the fruit grasping means are released for operative engagement with fruit advanced thereto.
Figure 9:
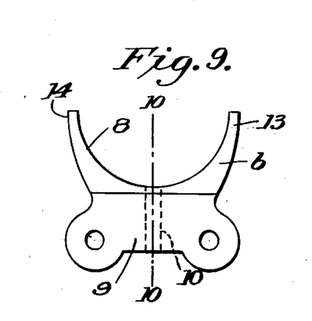
Figure 9 is a side elevation of one of the fruit supports of the conveyer for advancing the fruit to the zone at which it is seized by the fruit grasping means.
Figure 10:
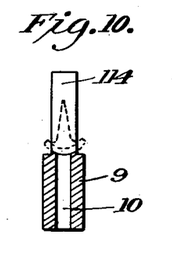
Figure 10 is a detail sectional view, taken upon the line 10, of Figure 9.
Figure 11:
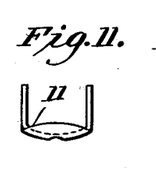
Figures 11 and 12 are detail framentary views of further features of the fruit supports, in detached position.
Figure 12:
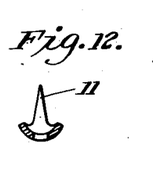

The means H is illustrated in detail in Figures 8 to 12 inclusive, and said means may include a continuous chain 3 and which chain is adapted to pass over a sprocket 4 provided with the usual axle 5 received in bearings 6 which are carried by the bed 2. A second sprocket adjacent the fruit grasping means D is shown at 7 and this sprocket may likewise be provided with the usual axle and bearing members for carrying the same. Mounted upon the chain and in spaced relation are a series of fruit supports $b$ which may comprise a relatively thin member associated with links of the chain 3. If desired, the fruit supports may form a part of the chain or they may be joined thereto by any suitable means such as rivets or by brazing. In the drawing, however, each fruit support $b$ is shown as an integral part of the chain formation. What would constitute the top of the chain is extended so as to form an arcuate part 8, and the members $b$ may be bored as at 9 for the reception of a pin 10 which is adapted to maintain within the arcuate portion 8, a member 11, said member constituting spaced prongs best illustrated in Figures 11 and 12. The entire assembled construction is shown in Figure 8. When fruit is received within the hopper J it may be transferred to the fruit supports $b$ by placing the fruit within the arcuate portion 8 so that the fruit is engaged by the prongs as illustrated in Figure 8. It will be noted in particular that the arcuate portion 8 forms two arms as a part of the means $b$ as shown at 13 and 14, and that the fruit is maintained as between said arms. Arms, however, are not provided in a plane at right angles to the arms 13 and 14. The prong members 11 are for the purpose of holding fruit such as that illustrated at 15 from being disengaged from the members $b$ during travel of the members $b$.

Figure 2:
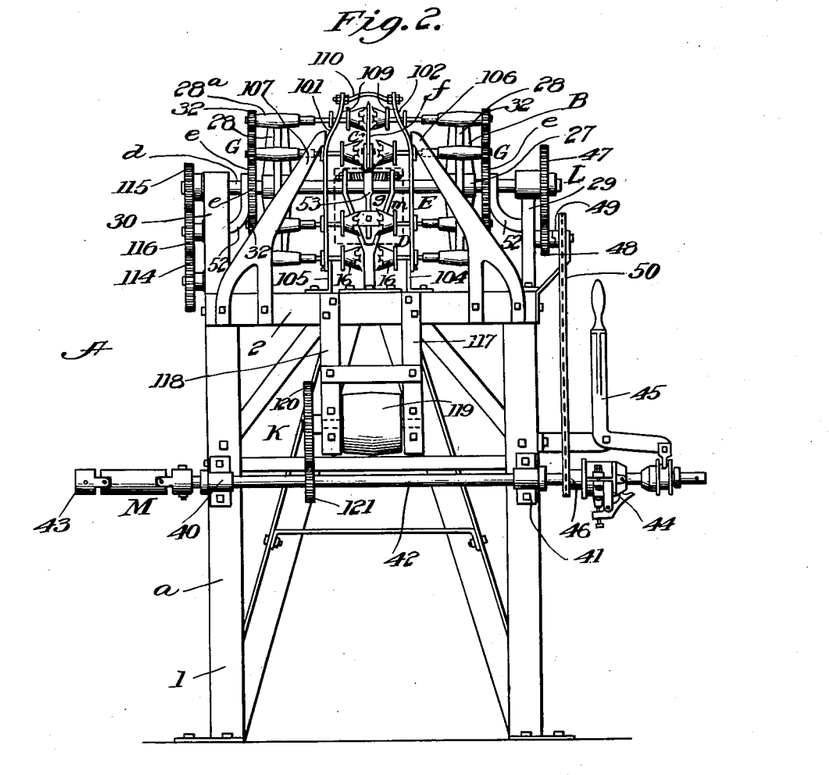
Figure 2 is a partial rear elevation of the same, parts being omitted for clearness of illustration, the same being on an enlarged scale.
Figure 5:
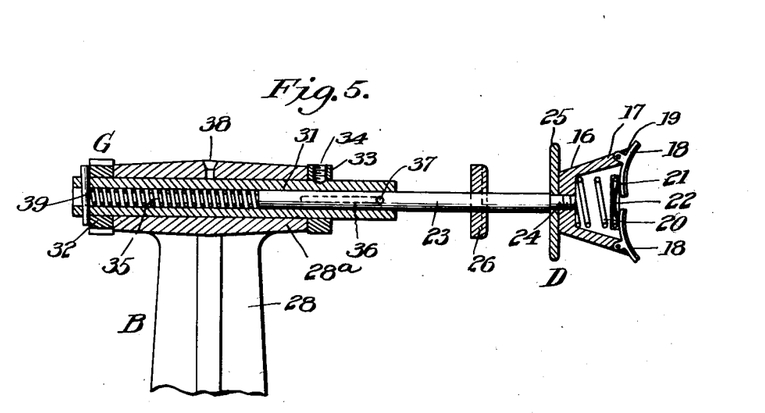
Figure 5 is an enlarged sectional fragmentary view of features of the invention pertaining to the fruit grasping means.
Figure 6:
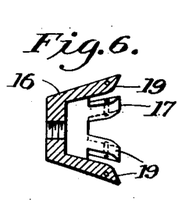
Figure 6 is an enlarged fragmentary sectional view of an element of the means shown in Figure 5, and taken upon the line 6—6, of Figure 7.
Figure 7:
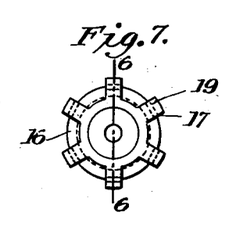
Figure 7 is a front elevation of the element shown in Figure 6.

When fruit carried by the means $b$ has traveled to a determined point the said fruit is engaged by the fruit grasping means D (see Fig. 8). In the embodiment of the invention shown the fruit grasping means work in pairs and are adapted to cooperate for the purpose of grasping the fruit, removing the same from the means $b$, and thence carrying the fruit upwardly to where the fruit is engaged by the fruit severing means C at which point the pit is removed from the fruit and the fruit split in halves. The fruit grasping means D, as stated, each include two members, and these two members by engaging the fruit transversely of the members $b$ will effectively withdraw the fruit from the members $b$ and from the prongs carried by the members $b$. It will thus be seen that the form of the means $b$ effectively provides for this operation, in that no interference results upon the closing of the grasping means D upon the fruit. The grasping means D illustrated in detail in Figure 5 is likewise shown in Figures 2, 6 and 7. Referring to Figure 2, it will be seen that the grasping means works in pairs and that the formation of each of said grasping means D is identical and for this reason only one side of the machine will be described, it being understood that the opposite side is the same.

Referring to Figure 5 the fruit grasping means D may include a cup or holder 16 the rim of which may be interrupted or in the form of spaced fingers or prongs 17, and pivotally carried by each such finger or prong 17 are fingers 18 which are slightly curved or arcuated in formation. It will be observed that the fingers 18 are pivoted substantially slightly beyond the common center of said fingers, and that the prongs 17 are provided with a downwardly inclined rim 19. Received within each of the holders 16 is a spring or other contractile or resilient member 20, one portion of which member 20 bears against the base of the holder, and the other end of which is adapted to receive a cap member 21. Said cap member 21 is slightly concave in formation, as shown at 22. Outward movement of the member 20 is restrained beyond a definite point by the fingers 18 contacting with the parts 19 of the fingers of the holder 16. In this connection it will be observed that relative movement of the fingers is permitted and that said inward movement in turn is slightly resisted by the outward pressure exerted by the member 20. The inner ends of the fingers 18 are readily received within the concavity 22 of the cap member 21 and make for easy operation of the fingers in their swinging movement. The holder 16 is carried upon a plunger 23, the plunger in this connection being reduced at the portion 24 and screw-threaded for reception in a screw-threaded opening of the holder 16. A shoulder is thus formed between the reduced portion 24 and the part 23 and a flange member or collar 25 having a diameter greater than the diameter of the base of the holder is carried upon the reduced portion 24 bearing against the shoulder of the plunger 23 and retained in position by the holder 16 bearing against the surface thereof, as shown in Figure 5. Likewise carried upon the plunger is an enlargement or collar 26 spaced from the member 25. The plunger 23 is carried by the fruit advancing means B, which means B comprises a member $c$ which includes a hub 27 and a series of spokes 28 radiating therefrom. The extremity of each spoke 28 is formed with a bearing 28ª. To support the fruit advancing means B a shaft $d$ is suitably carried by means of journal standards 29 and 30 mounted upon the bed 2. The hub 27 is keyed or otherwise held to the shaft $d$ so that rotation of the shaft will produce rotation of the means D. The bearings 28$^a$ are mounted transversely of the extremities of the spokes 28, and received within each bearing 28$^a$ is a spindle 31. Mounted upon one end of each spindle is a gear 32 constituting means for rotating the spindle and likewise carried upon the spindle, and at the other end of the bearing 28$^a$ is a collar 33 held to the spindle as by suitable means 34. Received within the spindle 31 and adapted to bear against an end of the plunger 23 is a coil spring 35. The spindle is provided with an axial slot 36 and the plunger carries a pin 37 entering said slot, so that rotation of the spindle will produce rotation of the plunger 23 and yet permit axial movement of the plunger within the spindle, said axial movement being opposed by the spring 35. The housing or bearing member 28$^a$ is provided with a capped opening 38 to permit oiling to thus reduce friction during rotation of the spindle within said housing. In Figure 5 the spindle is shown as transversely bored for reception of a cotter pin or tapered pin 39 to retain one end of the spring 35 within the spindle. As stated, a plurality of fruit advancing elements are provided and each one is identical with the description given of Figure 5. Likewise as shown in Figure 2, two complete members are provided which are adapted to act in conjunction to effect said grasping of the fruit. In other words, two holders 16 are provided, the open mouths of which are directed toward each other so that they may co-operate in opposed relation.

Carried by the legs 1 are bearing brackets 40 and 41 adapted to receive and carry a shaft 42, said shaft being driven by any suitable power means, not shown, from the end 43. Said shaft 42 in turn communicates with a clutch member 44 which is operated by means of a handle 45, and a member 46 operates in conjunction with the clutch 44. Thus an inward movement of the handle 45 in one direction will permit the member 46 to be rotated when the shaft 42 is rotating. A gear 47 is carried by an end of the shaft $d$, which gear 47 is adapted to mesh with a second gear 48 carried by the standard 29. A sprocket wheel, not shown, operates in conjunction with the gear 48 and the hub of said sprocket, as 49, is stepped as is the hub of the gear 48, so that the two may cooperate. A chain member 50 passes over a sprocket carried by the member 46 and with the sprocket associated with the gear 48 so that rotation of the part 46 will produce rotation of the gear 48, in turn rotating the gear 47 and the shaft $d$. It is intended that the fruit grasping means D should be rotated during rotation of the fruit advancing means B, and to accomplish this rotation I provide stationary gear wheels $e$. The gears 32 of the fruit advancing means B are adapted to mesh with the teeth of gears $e$, and as the advancing means B is rotated the gears 32 are rotated, which will produce rotation of the fruit grasping means D. The gears $e$ are provided with the usual hub members and are carried upon the shaft $d$. In this connection brackets 52 are provided for each gear, being associated with the standards 29 and 30 respectively, and the hub of each gear $e$ is adapted for reception within an enlarged opening in the brackets 52, there being a set screw provided which is carried by each bracket 52 and adapted to contact with the hub of the gear $e$. Thus the gears $e$ are prevented from rotating and in addition the gears $e$ may be adjusted axially to meet varying conditions and requirements of use and service. The fruit advancing means as well as the fruit grasping means sometimes must be adjusted, depending upon the size of the fruit and from other causes, and the movement permitted for the stationary gears $e$ allows the gears 32 to at all times properly mesh with the teeth of the stationary gears $e$. It will of course be understood that the brackets 52 are provided with transverse openings through which the shaft $d$ passes.

Assuming that fruit has been engaged by the opposed fruit grasping member D the fruit is advanced and likewise rotated until it contacts with the serving or pit-discharging means C at which point the fruit is completely or circumferentially sliced or cut with the pit removed from said fruit. The fruit severing and pit-discharge means C may comprise a knife $f$, which knife is secured to an arm 53, the arm being maintained between the prongs of a yoke member $g$, which yoke member is provided with the usual stem joining the prongs 54 and 55 thereof, and a stem 56 is associated and bolted to the bed 2. In particular the member $g$ is arranged centrally of the opposed fruit grasping means D. The prongs 54 and 55 are each provided with a longitudinal slot 57, there being a bolt 58 extending between the prongs 54 and 55 and passing through the slot 57 and maintained in some given position within said slot by lock nuts 59. The arm 53 is carried upon the bolt 58 and coil springs 60 and 61 are likewise carried upon the bolt 58, said coils acting to oppose rocking movement of the knife $f$. To accomplish this each coil has an end thereof looped about the prongs 54 and 55 respectively, with the other ends of said coil springs looped about the member 53. Thus a rocking movement of the arm 53 or the knife *f* would tend to tighten the coils of the springs 60 and 61 about the bolt 58 and likewise tend to oppose any rocking movement of the knife *f*. The arm 53 may be furcated at one end as shown at 62 and the knife *f* bolted between the furcations. The knife *f* is curved as shown at 63 with a part serrated as at 64, and a second part brought to a knife edge, as shown at 65. The knife *f* is provided with a crest at 66, and extending between the prongs 54 and 55 is a piece 67 which is screw-threaded for reception of a bolt 68, an end of which is adapted to engage an edge of the arm 53, as shown at 69. Thus movement of the knife and its arm is regulated in one direction by regulating movement of the bolt 68. Movement of the arm 53 is restricted in the opposite direction by a piece 70 extending between the prongs 54 and 55.

Figures 3, 4:
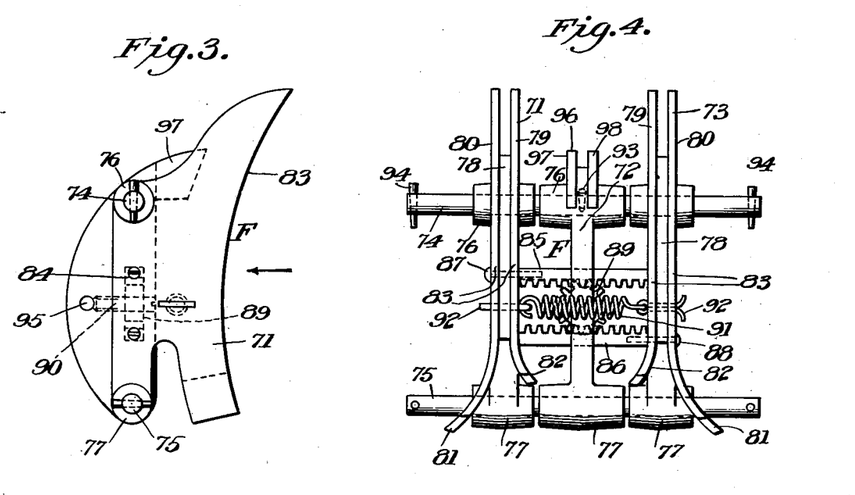
Figure 3 is a fragmentary elevation upon an enlarged scale, of features of the machine directed at centralizing the fruit before the severing thereof and the pit extraction.
Figure 4 is a view of the same features in detached position, looking in the direction of the arrow in Figure 3, and likewise upon an enlarged scale.
Figures 13, 14:
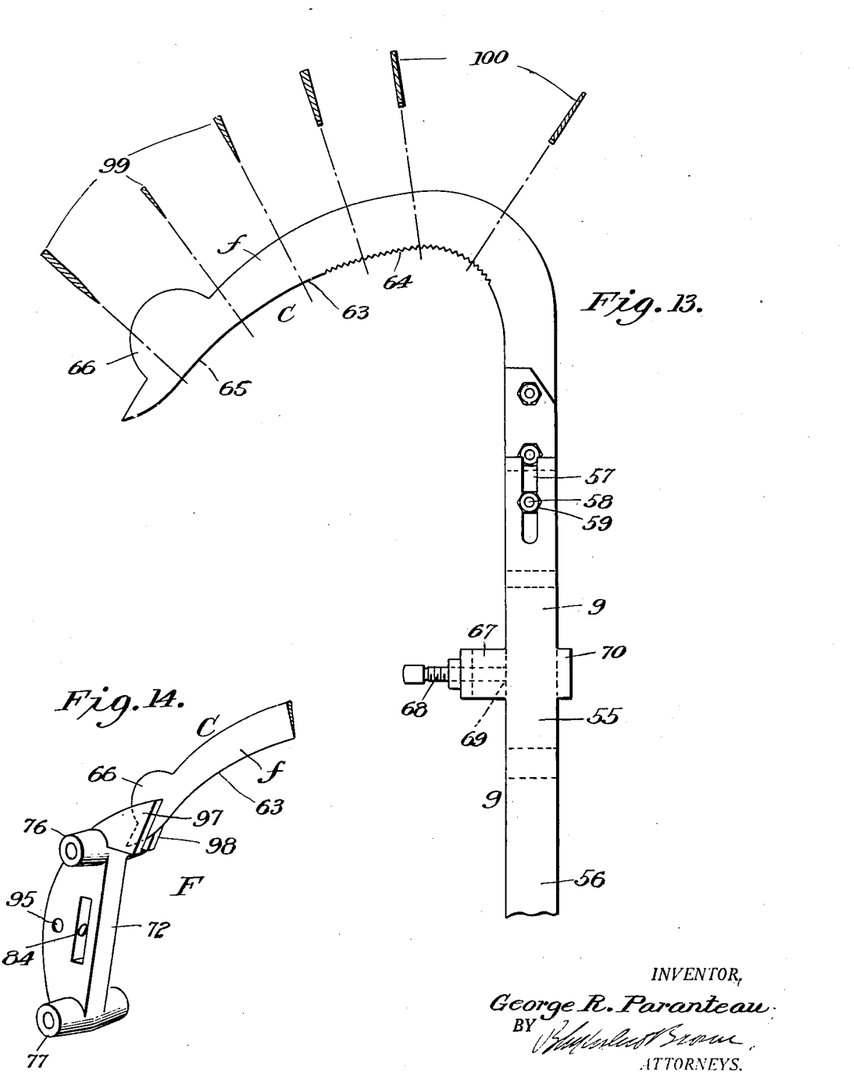
Figure 13 is a detail enlarged fragmentary side elevation of features of the fruit severing and pit-removing means.
Figure 14 is a fragmentary perspective view of fruit severing means and a portion of the centering means; and, Figure 15 is an end elevation of the fruit severing means shown in Figure 13.
Figure 15:
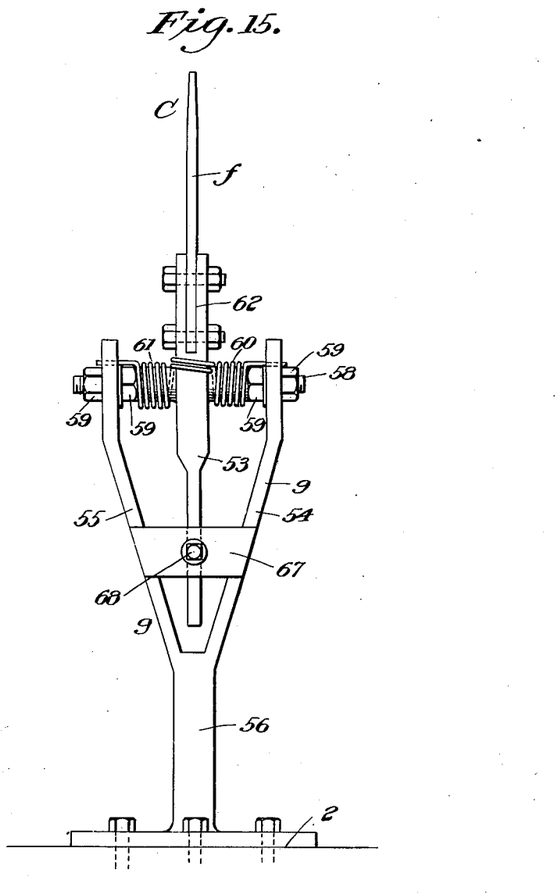

It may so happen that fruit delivered to the fruit grasping means D is of varying size and if this is the case the fruit might not be centered with relation to the knife so as to cut the same and remove the pit from the fruit in a proper manner. It is therefore necessary that the means F for centering the fruit be provided, which means would act in conjunction with the fruit-grasping means D. The means F for accomplishing this centering movement is illustrated in detail in Figures 3 and 4, and said means F is held in position by a standard *h* joined with the bed 2 of the frame A. The means F is formed in three parts and comprises members 71, 72 and 73, the members 71 and 73 being termed guides. Two shafts 74 and 75 are provided and the members 71, 72 and 73 are each provided with hubs 76 and 77 through which the shafts 74 and 75 pass; that is, the shaft 74 passes through the hubs 76 of said members and the shaft 75 through the hubs 77 of said members. The guides 71 and 73 are grooved as shown at 78 forming two flanges as 79 and 80 for each guide. The flanges 79 and 80 have the lower extremities thereof converged outwardly as shown at 81 and 82. In addition the edges of the flanges 79 and 80 are concave as shown at 83 forming almost a true arc of a circle. The member 72, and particularly the arm portion extending between the hub portions 76 and 77 thereof, is transversely slotted, as shown at 84. Racks 85 and 86 extend through said slotted portion, the rack 85 being rigidly connected to the guide 71, as shown at 87, and the rack 86 rigidly joined to the guide 73, as shown at 88. Likewise received within the slot 84 is a pinion 89, the teeth of which mesh with the teeth of the racks 85 and 86, and said pinion 89 is conveniently held within the slot 84 by a pin 90 passing within a screw-threaded opening in the member 72. A coil spring 91 is interposed between the guides 71 and 73 and held to said guides by any suitable medium such as cotter pins 92. This contractile member or spring 91 tends at all times to maintain the members 71 and 73 in close proximity or relation to the member 72, and in this connection it is to be noted that the member 72 is keyed centrally of the shaft 74 as by means 93. It is further noted that the shafts 74 and 75 have their ends extending beyond ends of the hubs 76 and 77 of the guides 71 and 73, with means 94 carried at each end of the shafts 74 and 75 for limiting movement in one direction of said hubs 76 and 77. It will thus be seen that if the hub 77 of the member 72 was grasped and held in position, assuming the structure of Figure 4, per se, a pulling movement on the guide 73 to the right would tend to rotate the pinion 89 to the left and force the member 71 to the left a distance equal to the distance the member 73 is from the member 72. The member 72 is provided with an opening 95 (see Fig. 3) through which a bolt may pass for attachment with the standard *h*. The member 72 is likewise provided with a guide 96, best illustrated in Figure 14, said guide comprising two small spaced flanges 97 and 98.

Figure 1:
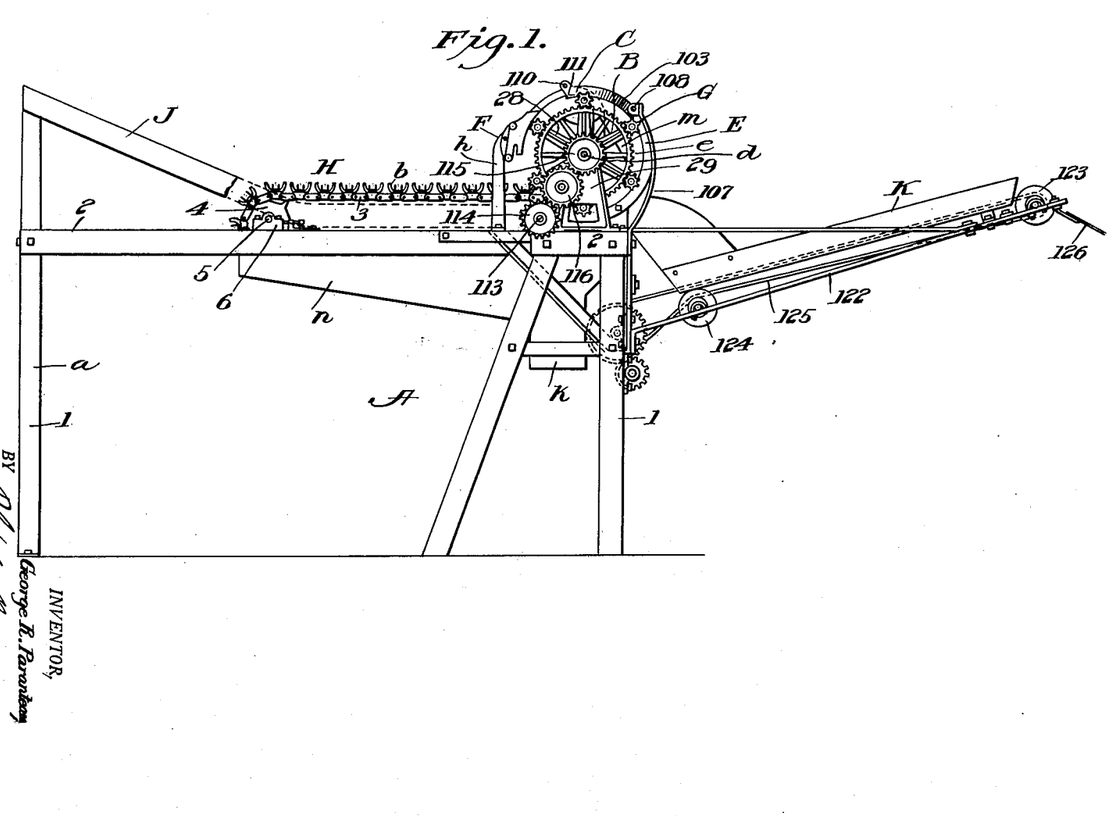
Figure 1 is a side elevation of a fruit pitting machine constructed to embody the invention.

The fruit severing or discharging means C has its crest 66 received between the flanges 97 and 98 of the guide 96, as shown in Figures 1, 3, 4 and 14, and the means C and the means F are so related as to form an arc, as shown in Figure 1. In other words, the face or edge 83 of the guides 71 and 73, and the edge 63 practically present an arc or curve which might be generated, taking the axle *d* as a center. It will thus be seen that the means C may be allowed to swing upwardly or downwardly, but not laterally, while the point of same will be maintained between the flanges 97 and 98 by the crest 66. As shown in Figure 13 the knife is of varying cross section, the part 65 being brought to an edge, as shown at 99, while that part which contains the serrations 64 is wide and tapers inwardly near the top of the knife, as shown at 100. The reason for this construction will be described later in the operation. As the knife is relatively thin there may be a tendency for the knife to move slightly, and by holding the crest 66 between the flanges 97 and 98, the point of the knife is at all times accurately centered between the grasping means D. It is therefore essential that the grasping means D should at all times be centered relative to the severing means C, and this is accomplished in the following manner: The opposed holders 16 are allowed to approach each other to a determined point. If we assume that fruit has been delivered between two of said holders 16 and that the coil spring 35 urging one of the plungers 23 of said holders outwardly is weaker than the opposed spring, pressing the plunger of the other holder outwardly, it would follow that the fruit would not be properly centered if it were allowed to move upwardly to where it engages with the severing means C. Assuming then that the holder were moved out of alignment with the means C, and that said movement was to the right, the flange 25 of the right-hand holder 16, would contact with the flange 79 of the guide 71 and the flange 25 of the right-hand holder would contact with the flange 80 of the guide 73. As the guides 71 and 73 can either move inwardly or outwardly in step with each other but never in the same direction, it follows that an inward push upon the flange 79 of the member 71 would cause an inward movement of the guide 73. Consequently the fruit grasping members would be forced in the same direction to the left. This movement of course would tend to centralize the fruit grasping means D so that the center of any object carried between the holders 16 would be centered with respect to the member C. If the fruit were unusually large the swinging action allowed the means C would permit the same to be lifted upwardly slightly so that the fruit would be properly cut without mashing the same.

It follows of course that the fruit grasping members, and particularly the opposed holders 16 must be open in order to receive the fruit delivered to said grasping means when the conveyor H has moved the fruit to proper position such as illustrated in Figure 8, and this opening and closing of the opposed grasping means is accomplished by the releasing means E. The releasing means is best shown in Figures 1, 2 and 8, and said releasing means may comprise two bars 101 and 102 which are curvedly bent longitudinally substantially in the arc of a circle, as shown in Figure 1 at 103. The bars 101 and 102 are in spaced relation and each bar is equally spaced from what might be termed the common center of the machine; that is to say, the zone intermediate the grasping means D, which zone would be on the center line of the means C and its associated elements. The members 101 and 102 are held to the bed 2 by suitable brackets 104 and 105. They are further held by brackets 106 and 107, said brackets being connected to the bed 2 and to a portion of each member 101 and 102, at an upper point, as shown at 108 in Figure 1. Each member 101 is given an inward curve, as shown at 109 and then held in position by means of a bolt 110 carried by the members for actively securing the ends of the members 101 and 102. The upper ends of the members 101 and 102 terminate at the portion 111 and the opposite ends of said members terminate slightly above and beyond the vertical axis of the sprocket 7, as shown at 112 in Figure 8. The sprocket 7 is carried upon a shaft 113 and the shaft in turn is carried in suitable journal portions of the bed 2, with one end of said shaft 113 carrying a gear wheel 114. A gear wheel 115 is likewise carried on an end of the shaft $d$ and an idler 116 has its teeth in mesh with the gears 114 and 115. The ratio of the various gears is such that when the shaft 42 is rotating and the shaft $d$ turned, the fruit supports $b$ are brought in proper sequence between the grasping means D. As the grasping means D moves upwardly the same are first centered by the means F and after the knife $f$ has been passed between the opposed holders of each of said grasping means, the enlargement or flange 26 contacts with the curved portion 109 of each member 101 and 102, as illustrated in Figure 2, and tends to force the plungers of each of said means outwardly so as to open or spread apart the opposed holder members of said grasping means D. This inward movement of the plungers is of course opposed by the springs 35 of the means G, and each of said means D is held in an open position as illustrated in Figure 2 until the enlargements 26 slide from the ends 112 of the members 101 and 102. In Figure 8 the enlargement 26 has just left the end of the member 101, and the fingers 18 of the holder members 16 have just closed upon the fruit held by the fruit supports $b$. As the means D moves substantially straight upwardly as shown by the enlarged arrow, the fruit is pulled from the prongs 11 without tearing the same, whereupon the sprocket 7 which is rotating, advances the fruit holder $b$. As the grasping means D moves upwardly the said means is rotating and advancing and fruit held by said means is sliced circumferentially by the knife edge of the knife $f$ of the means C and if the pit of the fruit should happen to be smooth as in the case of apricots the serrated edge 64 will engage said pit and tend to force it from the apricot. Just before the fruit reaches the serrated portion 64 the holders $b$ commence their separation by the enlargements 26 engaging the outside of the members 101 and 102, and the knife by having a varying cross section in which the upper edge of said knife, as shown at 100, is thinner than the base, allows the fruit to slip along past said knife without tearing the fruit, and as the caps separate further the pit is forced by encountering the shank of the knife from between the two halves of the fruit and the said pit falls into the open mouth of a pit spout and is delivered into a hopper $k$, the two halves of the fruit being directed into the hopper K by means of an apron $m$. The apron $m$ may be conveniently secured in position by means of two clips, not shown, carried by said apron and associated with the prongs 54 and 55 of the means $g$, the bottom of said apron terminating so as to allow the fruit to drop into the hopper K. Within the hopper K is a traveling conveyer which consists of a non-ending belt constituting the base of such hopper. Movement of the belt is accomplished by providing two standards 117 and 118 attached to the bed 2 and having a roller 19 journaled therebetween with the shaft of said roller carrying a gear 120, there being a second gear 121 carried by the shaft 42, with the teeth of said gear in mesh with the teeth of the gear 120. An extension 122 from the legs 1 acts to support the hopper K and likewise carries at its upper end a flanged roller 123 with the shaft of said roller received in suitable journal members in the extension 122. A second flanged roller is carried by the extension 122, as shown at 124, and a non-ending belt 125 is adapted to pass about the roller 119, the roller 123, and over the roller 124, as illustrated in Figure 1. A suitable receiving hopper may be disposed at the point 126, and a second hopper which may form a continuation of the hopper $k$ is provided at $n$.

The operation of the device is as follows:

Assuming that the hopper J is filled with fruit, the fruit may be transferred to the means $b$, either by hand or automatically, and each of the means $b$ carries one piece of fruit. When the conveyer H is moving all other parts constituting the mechanism is likewise in motion and the grasping means D will be rotating and advancing and the belt 125 will be in motion. As the fruit is advanced, the grasping means D which constitutes each pair of opposed holders, will slip from the members 101 and 102 constituting the fruit releasing means E, and allow the fingers 18 to move inwardly so as to encircle the fruit without crushing or bruising the same. If the fruit is not properly centered with respect to the fruit severing means C the centering means F will bring the fruit grasping means D back to a position so that the fruit will be presented at its substantial center to the fruit severing means C by the guides 71 and 73 cooperating with the enlargements or flanges 25 which would center the fruit. This centering operation is accomplished by the flanges engaging said guide-ways, and as the guide-ways are capable of movement either toward or away from each other, but not in the same direction, the resultant movement of the flanges 25 associated with the means D would be in the same direction, either to the left or the right, which movement would tend to center the fruit with respect to the means C. As the knife $f$ of the means C is relatively thin, it may happen that a portion thereof would bend during cutting movement of the fruit and if the knife were not held at its forward end the tip thereof would not engage the following fruit carried by other grasping elements at the center portion thereof, and for this reason the crest 66 is provided for said knife and is received between the flanges 97 and 98, said flanges permitting the knife to rock upwardly or downwardly, but not laterally, depending upon adjustment of the screw 68 carried by the means $g$ and yet accurately hold said point of the knife in true central relation between the fruit grasping means D. The movement allowed the knife will of course compensate for the different sizes of fruit, and the grasping elements are spread apart by the members 101 and 102 constituting the releasing means E, with the halves of the fruit dropped upon the apron $m$ and thence delivered within the hopper K and delivered from said hopper on the traveling belt 125 to some point, as 126. It has been found by experience that it is preferable to drop water on the fruit as it is carried on the conveyer H, and likewise drop water on the grasping elements D and through the hopper $k$, the bottom of said hopper being open and there being a sump beneath the frame A, said sump not being shown. The circulation of water over the various parts on the fruit helps to prevent gumming of the various mechanisms due to any juices secreted by the fruit or otherwise.

It is obvious that various changes and modifications and variations may be made in practicing the invention in departure from the particular description and showing in the accompanying drawing, but all of said changes and variations, however, may be made within a fair interpretation of the invention, as defined by the scope of the appended claims.

Having thus disclosed my invention, I claim and desire to secure by Letters Patent:

1. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all times to restore said members to their positions of closest approach.

2. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all times to restore said members to their positions of closest approach; each of said centralizing means members comprising a guide having a curved portion adapted to cooperate with said fruit-grasping means.

3. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all times to restore said members to their positions of closest approach; each of said centralizing means members comprising a guide having a curved portion adapted to cooperate with said fruit-grasping means; said fruit grasping means comprising separate opposed relatively movable yielding members each of which is adapted to cooperate with one of said guides.

4. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all times to restore said members to their positions of closest approach; each of said centralizing means members comprising a guide having a curved portion adapted to cooperate with said fruit-grasping means; said centralizing means further including opposed racks, and a pinion meshing with said racks, said guides being mounted respectively upon said racks.

5. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all time to restore said members to their positions of closest approach; each of said centralizing means members comprising a guide having a curved portion adapted to cooperate with said fruit-grasping means; there being guide means intermediate said guides and effective to maintain said fruit-severing and pit-discharging means in its zone of service.

6. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all times to restore said members to their positions of closest approach; each of said centralizing means members comprising a guide having a curved portion adapted to cooperate with said fruit-grasping means; said fruit-severing and pit-discharging means comprising a curved knife disposed in the plane of advancement of the fruit, a support for the knife, and resilient means exerting a tendency to maintain the knife in normal position and opposing movement of the knife in a direction opposite to that of the advancement of the fruit.

7. In a fruit pitting machine, fruit severing and pit-discharging means yieldingly mounted, means for advancing pieces of fruit successively to the fruit severing and pit-discharging means, and means opposing yielding movement of said last named means consequent upon engagement of a piece of fruit therewith, whereby the fruit severing and pit-discharging means is restored to normal position prior to engagement with the succeeding piece of fruit, and further means limiting the yielding play of said fruit severing and pit-discharging means.

8. In a fruit pitting machine, fruit severing and pit-discharging means yieldingly mounted, means for advancing pieces of fruit successively to the fruit severing and pit-discharging means, and means opposing yielding movement of said last named means consequent upon engagement of a piece of fruit therewith, whereby the fruit severing and pit-discharging means is restored to normal position prior to engagement with the succeeding piece of fruit; further means being provided cooperating with said fruit severing and pit-discharging means to hold the same against displacement transversely of the path of the advancing pieces of fruit.

9. In a fruit pitting machine, fruit severing and pit-discharging means yieldingly mounted, means for advancing pieces of fruit successively to the fruit severing and pit-discharging means, and means opposing yielding movement of said last named means consequent upon engagement of a piece of fruit therewith, whereby the fruit severing and pit-discharging means is restored to normal position prior to engagement with the succeeding piece of fruit; further means being provided cooperating with said fruit severing and pit-discharging means to hold the same against displacement transversely of the path of the advancing pieces of fruit; in combination with fruit centralizing means causing substantially the central presentation of the pieces of fruit to said fruit severing and pit-discharging means.

10. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all times to restore said members to their positions of closest approach; means being further provided for causing axial movement of the fruit-grasping means during the advancement thereof.

11. In a machine of the character disclosed, means for severing fruit and discharging the pit therefrom, means for grasping the fruit, means for advancing the fruit so grasped toward the fruit severing and pit-discharging means, said fruit-grasping means being capable of movement in entirety transversely of the path of advancement of the fruit, and centralizing means for causing the substantially central presentation of the fruit to the severing and pit-discharging means; said centralizing means comprising members relatively and oppositely adjustable, means confining said members to equal movements in opposite directions, and means exerting a tendency at all times to restore said members to their positions of closest approach; means being further provided for operating the fruit-grasping means to release the discharge of the pit therefrom.

12. In a fruit pitting machine, fruit-grasping means including a plunger, a fruit holder mounted upon the plunger, a housing for the plunger, means within the housing yieldingly resisting movement of the plunger in one direction, a support for the housing and within which the housing is rotatably supported, means constraining the plunger for rotation with the housing, and means for rotating such housing; thrust means being provided upon the housing at spaced points, said thrust means cooperating with the housing support.

13. In a fruit pitting machine, a fruit holder comprising a cup, spaced fingers pivotally mounted at the rim portion of the cup, and resilient means within the cup and operating upon said fingers.

14. In a fruit pitting machine, a fruit holder comprising a cup, spaced fingers pivotally mounted at the rim portion of the cup, and resilient means within the cup and operating upon said fingers; means being provided limiting pivotal movement of the fingers in one direction.

15. In a fruit pitting machine, a fruit holder comprising a cup, spaced fingers pivotally mounted at the rim portion of the cup, and resilient means within the cup and operating upon said fingers; said resilient means comprising a relatively sensitive open coil compression spring.

16. In a fruit pitting machine, a fruit holder comprising a cup, spaced fingers pivotally mounted at the rim portion of the cup, and resilient means within the cup and operating upon said fingers; said cup having an interrupted rim portion providing prongs upon which said fingers are respectively pivotally mounted.

17. In a machine of the character disclosed, an endless conveyer, and a fruit support mounted thereon and comprising a base provided with up-standing members, and fruit penetrating means within the region of the up-standing members.

18. In a machine of the character disclosed, an endless conveyer, and a fruit support mounted thereon and comprising a base provided with upstanding members, and fruit penetrating means within the region of the up-standing members; there being a base member for the up-standing members and means being provided for holding said fruit penetrating means in position.

19. In a fruit pitting machine, fruit severing and pit-discharging means comprising an edge knife and means for advancing fruit to such knife, said knife being serrated for engagement with the pit of the fruit; said knife being so serrated in only part of its cutting edge.

20. In a fruit pitting machine, fruit severing and pit-discharging means comprising an edge knife and means for advancing fruit to such knife, said knife being serrated for engagement with the pit of the fruit; said knife being so serrated in only part of its cutting edge, and being longitudinally curved.

21. In a fruit pitting machine, fruit severing and pit-discharging means comprising an edge knife and means for advancing fruit to such knife, said knife being serrated in part for engagement with the pit of the fruit; the serrated part of said knife progressingly increasing in width from the unserrated portion of said knife.

22. In a fruit pitting machine, fruit severing and pit-discharging means comprising an edge knife and means for advancing fruit to such knife, said knife being serrated in part for engagement with the pit of the fruit; said knife in the zone of the serrated portion being of varying cross-section.

23. In a fruit pitting machine, fruit severing and pit-discharging means comprising an edge knife and means for advancing fruit to such knife, said knife being serrated in part for engagement with the pit of the fruit; said knife being so serrated in only part of its cutting edge; a transverse section of the knife at the cutting zone tapering downwardly, and a transverse section of the knife at the serrated zone tapering upwardly.

24. In a fruit pitting machine, fruit severing and pit-discharging means comprising an edge knife and means for advancing fruit to such knife to cut the same into halves about the pit, said knife being formed to hold the pit against movement in one direction while the halves of such fruit pass beyond such knife; means further being provided for imparting axial movement to the fruit upon its presentation to the knife.

In testimony whereof, I have signed my name to this specification in the presence of two subscribing witnesses.

GEORGE R. PARANTEAU.

Witnesses:
M. R. ELLIOTT,
EARL H. WORKMAN.